United States Patent [19]

Casamatta et al.

[11] Patent Number: 5,247,629
[45] Date of Patent: Sep. 21, 1993

[54] MULTIPROCESSOR SYSTEM WITH GLOBAL DATA REPLICATION AND TWO LEVELS OF ADDRESS TRANSLATION UNITS

[75] Inventors: Angelo Casamatta, Cornaredo; Calogero Mantellina, Cerro Maggiore; Daniele Zanzottera, Busto Garolfo, all of Italy

[73] Assignee: Bull HN Information Systems Italia S.p.A., Italy

[21] Appl. No.: 469,870

[22] Filed: Jan. 24, 1990

[30] Foreign Application Priority Data

Mar. 15, 1989 [IT] Italy ................ 19787 A/89

[51] Int. Cl.[5] ................ G06F 12/08; G06F 15/16
[52] U.S. Cl. ................ 395/400; 395/425; 364/228.1; 364/931.46
[58] Field of Search ......... 395/400, 425; 364/200, 364/900

[56] References Cited

U.S. PATENT DOCUMENTS

| | | | |
|---|---|---|---|
| 4,456,954 | 6/1989 | Bullions, III et al. | 395/400 |
| 4,695,950 | 9/1987 | Brandt et al. | 395/400 |
| 4,754,394 | 6/1988 | Brantley, Jr. et al. | 395/400 |
| 4,831,512 | 5/1989 | Nakai et al. | 395/200 |
| 4,847,804 | 7/1989 | Shaffer et al. | 395/425 |
| 4,888,681 | 12/1989 | Barnes et al. | 395/600 |
| 4,914,570 | 4/1990 | Peacock | 395/650 |
| 4,928,224 | 5/1990 | Zulian | 395/325 |
| 4,965,717 | 10/1990 | Cutts, Jr. et al. | 395/425 |
| 4,991,081 | 2/1991 | Bosshart | 395/425 |
| 5,043,873 | 8/1991 | Muramatsu et al. | 395/650 |
| 5,067,071 | 11/1991 | Schanin et al. | 395/275 |
| 5,072,369 | 12/1991 | Theus et al. | 395/425 |
| 5,117,350 | 5/1992 | Parrish et al. | 395/425 |
| 5,123,101 | 6/1992 | Sindhu | 395/400 |

FOREIGN PATENT DOCUMENTS 0092895 1/1983 European Pat. Off.
0320607 6/1989 European Pat. Off.

*Primary Examiner*—Joseph L. Dixon
*Assistant Examiner*—Jack A. Lane
*Attorney, Agent, or Firm*—Faith F. Driscoll; John S. Solakian

[57] ABSTRACT

In a multiprocessor system having global data replication in each of the local memories, each associated with one of the processors, the global data allocation in the several local memories is performed by translating global data logical addresses into addresses conventionally defined as real, the translation being performed by a first translation unit associated with and managed by the processor which generates the global data. The first translation is followed by the translation of the real address into a physical address generally differing for each local memory and performed by a plurality of translation units, each associated with one of the local memories and managed by the processor associated with that local memory.

4 Claims, 2 Drawing Sheets

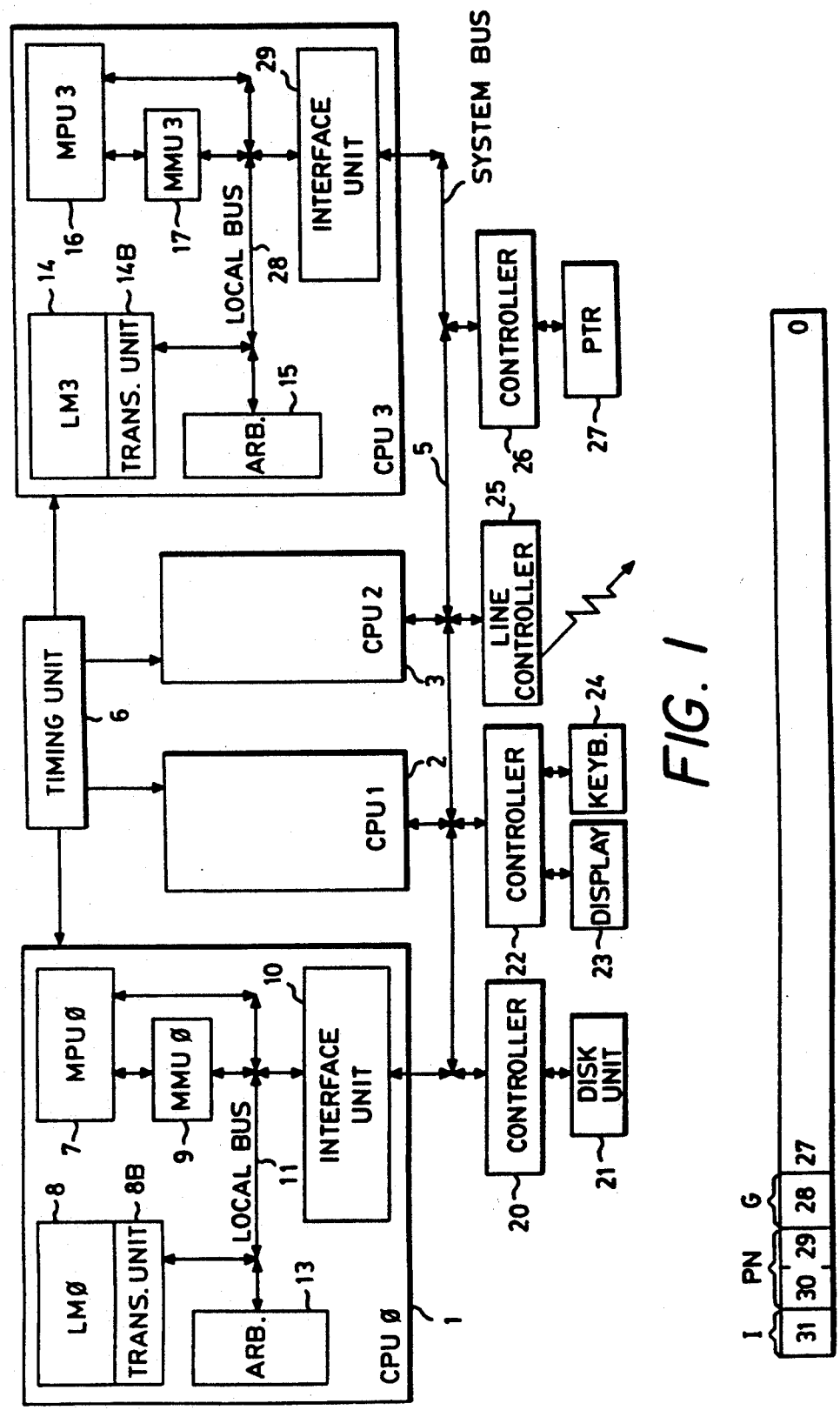

MULTIPROCESSOR SYSTEM WITH GLOBAL DATA REPLICATION AND TWO LEVELS OF ADDRESS TRANSLATION UNITS

RELATED APPLICATIONS

1. "Multiprocessor System Featuring Global Data Multiplication," invented by Ferruccio Zulian, Ser. No. 07/196,651, filed on May 19, 1988, now U.S. Pat. No. 4,928,224 and assigned to the same assignee as named herein.

2. "Multiprocessor System Having Global Data Replication," invented by Carlo Bagnoli, Angelo Casamatta and Angelo Lazzari, Ser. No. 07/423,820, filed on Oct. 18, 1989 and assigned to the same assignee as named herein.

BACKGROUND OF THE INVENTION

1. Field of Use

The present invention relates to a multiprocessor system with global data replication and two levels of address translation units.

2. Description of Related Art

Multiprocessor data processing systems are known where a plurality of processors, interconnected and communicating with each other through a communication bus, operate in a semi-independent or independent manner for concurrently executing a plurality of processes. Multiprocessors are used to obtain high performance. Multiprocessor systems may take several architectural forms which span from architectures defined in the literature as "tightly coupled" to "loosely coupled" ones.

Both architectures offer advantages and drawbacks. To overcome such drawbacks "tightly coupled" architectures have been proposed where certain resources, such as memory, are distributed among processors, but shared by the processors. A further improvement is achieved with the architecture described in the EP-A-88118058.2, corresponding to related U.S. patent application Ser. No. 07/196,651, filed on May 19, 1988, now U.S. Pat No. 4,928,224 where the concept of global data replication is introduced. In this architecture, having shared local resources, shared local memories in particular, each local memory contains a copy of the data which are used by a plurality of processors. These data are defined as global. Each processor may have access to the global data for reading without need to access the system bus.

In this kind of architecture, the problem arises of assuring the consistency or identity of the global data in each of the local memories. Every time a global data is generated or modified in a local memory, it has to be replicated or modified in all other local memories with procedures and apparatuses of multiple or global writing which constitute a feature described in the previously mentioned European patent application, as well as Italian patent application number 22652A/88, filed Nov. 18, 1988, corresponding to related U.S. patent application Ser. No. 07/423,820, filed on Oct. 18, 1989.

The present invention has for its object the resolution of another problem which occurs with the replication of global data in each of the local memories of a multiprocessor system having shared local resources. The problem consists in the allocation of the global data in the physical space of each one of the local memories which occurs by reason of the use of the virtual memory concept in the modern data processing systems. At program level, the instruction sequences and the set of information to be used are identified by logical addresses which are completely independent of the memory capacity and the effective physical allocation of the several information items in the memory.

Process execution by the several processing units is generally, if not always, performed by using logical addresses as references.

A memory management unit, commonly identified as MMU or ATB (Address Translation Buffer) converts the logical addresses into physical addresses. In case the MMU can also signal the missing of the requested information from the memory or its invalid status.

A component of the operating system or supervisor program, named MMM (Memory Management Module), manages, according to the needs, the MMU status and establishes the relation between logical addresses and physical addresses. The unit of memory location handled in this way is usually a page of four kilobytes. In other words, the address conversion is performed on a portion of the address. The least significant portion of an address which is named "offset" coincides in both the physical and logical addresses.

In multiprocessor systems having local memories, each processor has its own MMU and manages its own local memory in an autonomous way. Depending on the processes/programs to be executed, it decides which information has to be located in its own local memory and at which physical locations. This autonomy is essential for an efficient use of the memory resources but, in the case where the local resources are shared and the global data are replicated in each one of the local memories, it causes some problem in the allocation of the global data. Each processor which generates a set of global data in its own local memory and allocates them in a physical space of local memory, according to its own requirement, must find available a corresponding physical space in the local memory of the other processors. The physical space of the other memory must be defined by the same physical addresses where the replica of the generated global data may stored.

The problem could be solved by the previous reservation in each of the local memories of a predetermined physical space having the same addresses in each of the memories for the allocation of global data. However, this approach is rigid and results in memory wasting. It requires the reservation of a memory space to global data sufficing for allocating the maximum predictable volume of global data, even if the effective need, depending on circumstances, is less.

SUMMARY OF THE INVENTION

According to the invention, this problem is overcome by providing a multiprocessor system with two levels of address translation units and with a translation criterion which in case of global data and only for global data includes two translation levels. A logical or virtual address is translated by a first translation operation, into an intermediate level address which is defined as "real" only for the purpose of distinguishing it from a physical address. Thereafter, the real address is converted into a physical address by a second translation operation. These operations are performed by two pluralities of distinct MMUs.

A first plurality of MMUs, each one related to one processor of the system and addressed by the related processor is used to convert a logical address into a physical address or, in case of global data, into a real address. A second plurality of translation units, each one related to one of the local memories of the system and addressed by a real address generated by any one of the MMUs in the first plurality, is used to convert the real address into physical addresses, each specific to the related local memory.

In this way, each global data is characterized by a logical address to which a single real address is related and a plurality of physical addresses, generally differing from each other, each one for each of the system local memories. In this way, each copy of the same global data may be physically allocated at physical addresses which differ in each local memory, and the allocation may be performed in an autonomous way by each of the system processors as a function of the occupation status of its own local memory.

Additionally, since the real address is conventional information, different from the logical addresses which comprise a bit number sufficient to identify one information unit in a logical/virtual space much greater than the available physical memory space, the real address may comprise a bit number related to the effective size or capacity of the local memories, hence a smaller bit number.

The second level address translation units may therefore be implemented with static RAM memories having small capacities and full coverage of real addresses. In such memories, local memory physical addresses are stored and read out, each of the addresses being related to one of the possible real addresses which is used as the address for the static translation memory. The second level address translation unit is like and performs as a simple translation table. It does not require the constructive and management complications of conventional type of MMUs.

According to a further aspect of the invention, the translation units which convert a real address into a physical address additionally operate as memory module selection units, the selection being predetermined as a function of the relationship between physical address and real address. In other words, it is not required that a physical address be available to establish which of the memory modules must be selected and the selection may be performed with the knowledge of the real address. In this way, the time required for the translation from real to physical address, that is, the read time of the second level address translation unit, overlaps with the address decoding time required for the selection of the module. It does not add further delay in the reading process and from a timing standpoint is completely "transparent."

These and other features, and the advantages of the invention will appear more clearly from the following description of a preferred embodiment and from the following drawings:

BRIEF DESCRIPTION OF THE DRAWINGS

FIG. 1 is a block diagram of a multiprocessor system having global data replication and two levels of address translation units.

FIG. 2 shows the format of the physical addresses used in the-system of FIG. 1.

DESCRIPTION OF THE PREFERRED EMBODIMENT

Figure 3:
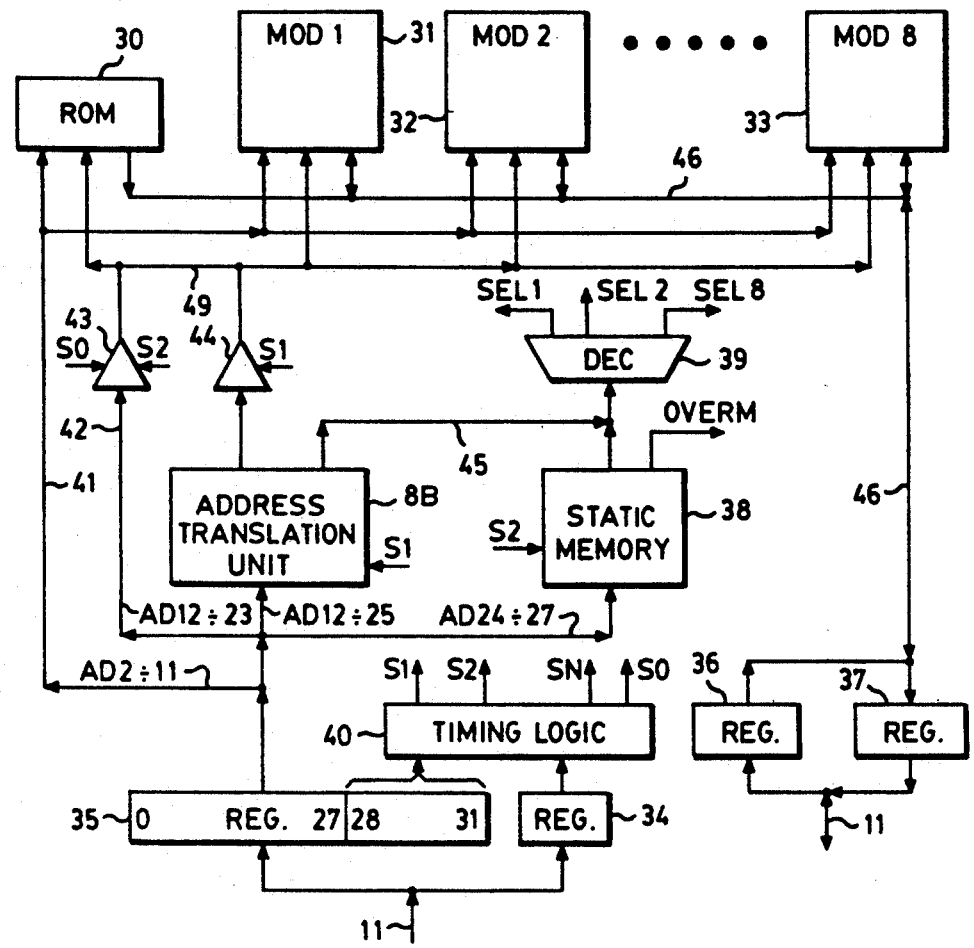
FIG. 3 preferred embodiment of local memory and related translation unit for converting real addresses to physical addresses in the system of FIG. 1.

Considering FIG. 1, the system comprises four central processing units (CPU0, CPU1, CPU2 and CPU3) 1, 2, 3 and 4 connected each to the other through a system bus 5. The system bus may be any kind of bus and preferably a standard bus such as the VME bus or the MULTIBUSII which are well known in the art. The several CPUs are timed by a timing unit 6. CPU0 comprises a microprocessor 7(MPU0), a memory address management unit 9 (MMU0), a local memory 8 (LM0), a local bus arbitrator 13 and an interface and arbitration unit 10. Microprocessor 7 communicates with local memory 8 and with the interface unit 10 by means of a local bus 11, arbitrated by arbitration unit 13. The local bus may be any kind of bus tailored to the specific requirements of the used microprocessor.

Microprocessor 7 may have access to the system bus through interface unit 10, for receiving and sending information to/from the other CPUs, as well as for having access to the local memories of the other CPUs, or to peripheral control units, connected to the system bus, such as a controller 20 of disk units 21, a controller 22 of a display 23 with keyboard 24, a line controller 25 and a controller 26 for a printer 27.

The interface unit 10, together with corresponding units of the other CPUs, arbitrates access to the system bus by the several CPUs and manages the communication protocol on the system bus. Through interface unit 10, the CPUs other than CPU0 may have access to the local bus 11 of CPU0 and from there to the local memory 8.

The address management unit 9, which in FIG. 1 is shown as a unit distinct from processor 7, may be integral to processor 7. For instance, this occurs if processor 7 is constructed from the integrated circuit microprocessor, designated as MC68030, marketed by Motorola Corporation. In addition to the address management unit 9 (MMU0), the CPU0 comprises, as a part of the local memory 8, a second address translation unit or translation table 8B, for converting real addresses of global data into physical addresses.

The other CPUs of the system have an architecture identical to the one of CPU0. Thus, for instance CPU3 comprises a local memory 14 (LM3), a processor 16 (MPU3), an address management unit 17 (MMU3), an interface unit 29, an arbitrator 15 for controlling access to a local bus 28 and a second translation unit 14B for converting real addresses into physical addresses.

FIG. 2 shows the format of the physical and real addresses used in the system of FIG. 1 and generated by the address management units such as 9 and 17. A physical or real address comprises 32 bits (bits 0-31). The most significant bits, from 31 to 28, respectively designated as I (for Internal space, bit 31), PN (for Processor Number, bits 29, 30) and G (for Global, bit 28) define the nature of the space addressed by bits 0-27.

The following table summarizes, among the several possible configuration of addresses, those which are of interest for understanding the invention. In the table, the symbols 1 and 0 correspond to the logical levels true and false respectively, and X represents a condition of indifference.

| BIT | | | | SELECTED SPACE | ADDRESS NATURE |
|---|---|---|---|---|---|
| 31 | 30 | 29 | 28 | | |
| 1 | 0 | 0 | 0 | Internal memory-local data | physical |
| 1 | 0 | 0 | 1 | Internal memory-global data | real |
| 1 | 0 | 1 | X | Internal registers | — |
| 1 | 1 | 0 | X | I/O peripheral space | — |

The most significant bits of the address identify a physical resource of the system (e.g. CPU local memory, registers, I/0 peripheral units). When the local memory is selected, they indicate (i.e., bit 28) if the address is related to a local datum or a global datum) and, therefore, if the bits from 0 to 27 are to be treated as a physical address or a real address. When internal registers are selected, the least significant bits from 0 to 27 or a portion thereof, constitute a code for the selection of one of a plurality of registers into which information has to be read out or written.

A typical example of internal register addressing occurs in the addressing of the memory management units 9 and 17 for loading them with information required to convert addresses from logical/virtual ones to physical ones. Likewise, in case of I/0 peripheral units selection, the bits from 0 to 27 or a portion thereof, form a code for the selection of one among a plurality of I/O peripheral units.

When the internal or another local memory is selected, the bits from 0 to 27 enable addressing up to 256 Mbytes of information at the byte level. The addressable memory space is conceptually composed of a plurality of pages, each page comprising 4K bytes, so that the bit field from 0 to 11 constitute an "offset," that is, a byte address within a page, and the bit field from 12 to 27 constitute a page address.

In the conversion of logical addresses into physical addresses, the criterion is usually followed of allocating information in the memory by pages. A logical page address is related to a physical page address and the "offset" is equal for both physical and logical addresses.

The same criterion may be followed in the allocation of global data, so that a real address may be considered as comprising an "offset" which does not change in the address conversion, and a real page address which requires conversion into a physical page address. By this assumption, an address translation unit 8B of FIG. 1, for converting real addresses into physical addresses, and providing a full coverage of all possible physical addresses, may consist of a translation memory having a capacity of 64K entries or addressable locations. The capacity may be less if one of the following restrictions is imposed:

A) Even if the addressable memory space of each local memory has a size of 256 Mbytes, the maximum effective capacity of the local memories is less and for instance, 64 Mbytes. In this case, the bits 26 and 27 of the physical or real page address are superfluous.

B) Even if the effective memory capacity of each local memory is 256 Mbytes, the global data are assumed to require a maximum of 64 Mbytes corresponding to 16K pages for their allocation. This number of real pages may be identified with a real page address of only 14 bits. In this case, to the extent real addresses are concerned, the bits 26 and 27 are superfluous.

In both cases, the conversion of a real page address into a physical page address may be performed by a memory having a capacity of 16K entries. The second restriction is assumed as acceptable and true in the following description.

FIG. 3 shows a preferred embodiment of local memory 8 and address translation unit 8B for the system of the invention. The local memory 8, preferably arranged with a parallelism of 4 bytes, comprises a read only memory or ROM 30 having small capacity, for instance 4 Kbytes, for system initialization, and a plurality of read/write memory modules 31, 32 and 33 up to a maximum of 8. In FIG. 3, the modules are labeled as MOD1, MOD2 and MOD8. Each module preferably has a capacity of 32 Mbytes, obtained with two banks of integrated circuits, each bank being formed by 32 (plus integrated circuits for parity bits or error detection/correction codes) integrated circuit components, each having a capacity of 4 Mbits.

The local memory 8 further comprises interface registers for latching commands (i.e., register 34), addresses (i.e., register 35), data in input to memory (i.e., register 36), and data in output from memory (i.e., register 37). A module and bank selection logic, essentially consisting of a static memory 38 and a decoder 39, is further included in the local memory 8. A memory control and timing logic 40 receives as inputs, the read/write commands latched in register 34, the most significant address bits, latched in register 35, and generates control and selection signals S1, S2, ... SN, with the required timing as a function of the input information.

The address translation unit 8B consists of a bank of 5 integrated circuits SRAMs, each having a capacity of 16K × 4bit (for instance, of the type marketed by HITACHI Corp., designated by code HM6788H) so as to obtain a parallelism of 20 bits. The "offset" bits AD 2-11, latched in register 35 are sent through a lead set 41 to ROM 30 and to the several modules 31, 32 and 33. The page address bits AD12-23 are through a lead set 42, through a set of tristate gates 43 and a bus 49 to ROM 30 and to the several modules 31, 32 and 33. The bits AD12-25 are a further input to the address inputs of SRAM memory 8B.

For each addressed entry, memory 8B outputs a 12 bit code which constitutes a least significant portion of a physical page address corresponding to the real address expressed by the input address. This code is broadcasted to the several modules 31, 32 and 33 through a set of tristate gates 44 and a bus 49. In addition to such code for each addressed entry, the translation memory 8B outputs a 4-bit selection code which is sent through leads 45 to decoder 39. The four most significant bits AD24-27 of page address, an output from register 35, are used as address for memory 38 which outputs a selection code as input to decoder 39.

The logic 40, depending on the logical level of bits 28-31 and other address bits, as well as on the contents of register 34, generates timed signals for memory activation and control signals SO ... SN. For instance, a signal SO, mutually exclusive with the signals SEL1 .. . SEL8, for bank and module selection, selects ROM 30. If the bits 31-28 have the configuration 1000, the address latched in register 35 is a physical address. Therefore, a signal S2 is generated which enables gates 43 and memory 38 respectively, to transfer the physical page address and the module selection code. If the bits 31-28 have the configuration 1001, the address latched into register 35 is a real address of a global data. Therefore, a signal S1 is generated which enables memory 8B to output a physical address corresponding to the real one as well as a corresponding module selection code.

The data to be written into the memory and latched in register 36 are distributed through channel 46 to all the modules and are written into the selected one. Channel 46 forms a collector for receiving from a selected module, the data read out from memory which is loaded into register 37. FIG. 3 does not show, for simplification purposes, memory write circuits for the memories 8B and 38 which are basically known. For example, U.S. Pat. No. 4,592,011 describes writing circuits for a memory such as memory 38 and a related memory mapping procedure used at system initialization.

DESCRIPTION OF OPERATION

The process for generation of real and physical addresses and the loading of translation SRAM 8B may be summarized as follows. At system initialization, each CPU, such as CPU0, activates a procedure for "bootstrapping" the operating system in a well known manner. Processor 7 controls a read operation at a fixed address of a register space which identifies ROM 30 as the destination and by the subsequent incrementation of an internal register (instruction counter), it fetches and executes a sequence of instructions. These instructions provide for the detection of the local memory capacity, the loading of the module selection logic, the activation of a peripheral unit controller (for instance, the disk unit controller 20 of FIG. 1) and the reading from the disk unit and the storing in local memory at predetermined physical addresses, a portion of the operating system, or supervisor, or kernel, according to the several current expressions. During this process, the status of MMU9 and translation table 8B is not relevant because they are not used. The same procedure is also followed by the other CPUs of the system, in autonomous way.

At this point, processor 7 has contained in its own local memory and as a kernel portion, a memory management module or allocator. This program identifies some predetermined and unmodifiable memory spaces, defined by physical addresses, where to allocate tables which describe the status of the local memory. At this point, the supervisor identifies the status of the system and the presence of processes or user programs waiting for execution. The information related to the system status is information used by all the CPUs and may be changed during this time, particularly due to the supervisor program or in the course of user process execution. This information is therefore a set of global data.

The allocator of processor 7 identifies a free space in the local memory 8 where to load such data and establishes a correspondence between physical addresses of such space, real addresses which it decides to assign to such data and logical addresses which are the same. The correspondence among addresses is loaded in tables which describe the local memory status, together with additional information, such as protection bit, valid/invalid table bits and so on. Then, it proceeds to load the translation memory 8B with the physical addresses corresponding to real addresses by addressing memory 8B with real addresses and writing therein, the physical addresses which are forwarded as data.

More precisely, in the case, such as the one shown in FIG. 3 wherein the translation memory performs the additional function of module and bank selection, the most significant bits of the physical address are substituted with a module/bank selection code determined as a function of the local memory configuration. It must be noted that so far, the global data have not yet been stored in the local memory, even if it has been planned where to allocate storage of such data.

At this point, processor 7 which for instance is the first to decide global data allocation in local memory, under supervisor control, notifies the other CPUs of the system of the need to reserve a certain memory space for allocation of global data, identified by predetermined real addresses and related logical addresses. This notification process may be performed by direct interprocessor communication or by indirect communication through a "mailbox," depending on the system features. Once this notification has been received, each CPU reserves, under control of its own allocator, the physical local memory space where to load the global data and defines its own correlation table between real addresses and physical addresses. It further loads the translation memory of its own local memory with the physical addresses so assigned (and related selection codes). Once this operation has been performed, it notifies to the requesting CPU, in this case CPU0, that the memory space has been reserved and that the loading operation may be performed.

Once having received confirmation by all other CPUs that the memory space has been reserved, (note: each CPU completely ignores which are the physical addresses of the memory space, used by other processors), CPU0 may then start the processes which generate global data and write such global data in its own local memory and at the same time into the local memory of the other processors with write commands which are defined as global write broadcasted to the other system processors through the system bus, as described in the previously mentioned patent applications. These global write commands use the real address rather than the physical address, as addressing information.

Therefore, it may be said that the processor which generates the global write command uses its own MMU as a first level translation unit for generating real addresses and then uses each one of the translation memories, each related to one of the several local memories and which are preset by the several processors as a second level translation unit for locally converting the same real address into a different physical address in each CPU. It .is clear that this operation of memory space allocation to global data may be performed and repeated during any time of the system operation not only at initialization time. It is performed every time it is required to allocate new memory space to new global data being that global data for use by the supervisor or global data needed by user programs which for a greater efficiency are concurrently executed by a plurality of processors.

It is clear that FIG. 3 shows a preferred embodiment for a local memory having a second level of address translation unit, additional to the first level translation unit coupled to each processor. Several changes can be made to this embodiment. For instance, tristate gates 43 and 44 of FIG. 3 may be substituted with a multiplexer. In addition, the direct coupling 5 between output of memory 8B and output of memory 38 implies that such memories have a tristate output which is enabled only if such memories are selected for operation. If this is not the case, a multiplexor has to be provided, in order to apply as inputs to decoder 39 either the signals present on leads 45 or the output from memory 38, in a mutually exclusive way.

As an alternative, the multiplexing function may be performed by decoder 39 which may receive the two sets of signals plus a control signal from unit 40 at different inputs. It is further clear that even if providing advantages in terms of operative speed, it is not required that the translation memory 8B performs the function of selection code generation.

Figure 4:
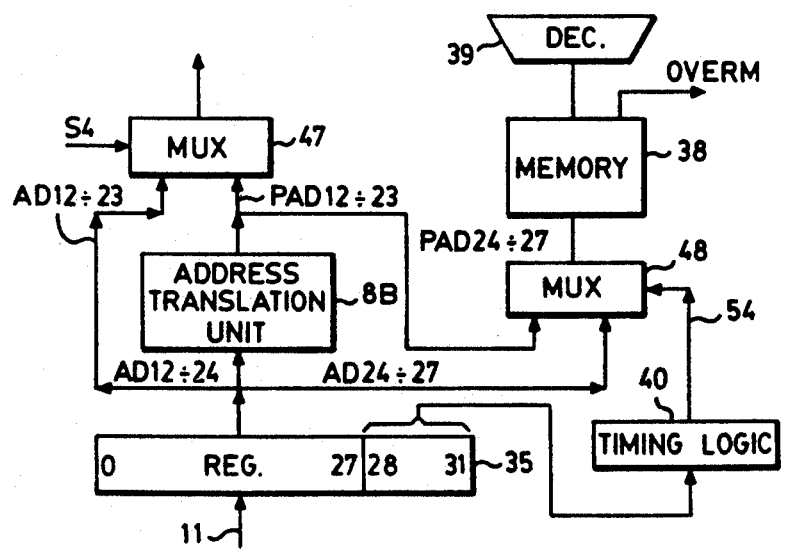
FIG. 4 shows an alternative embodiment of address translation unit for the system of FIG 1.

FIG. 4 shows an interconnection of translation memory 8B with a memory module selection unit where the module selection function is always and exclusively performed by the selection unit. In FIG. 4, unit 8B receives the real address bits AD12-24 an generates as outputs, the corresponding physical address bits PAD12-27. Bits PAD12-23 are applied as inputs to a multiplexer 47 which receives address bits AD12-23 (an output from register 35) at a second input set. Multiplexer 47 is controlled by a signal S4 to enable the transfer of the one or the other input information depending on whether the address stored in register 35 is a real or physical address. The bits PAD24-27, an output from memory 8B, are applied as an input to a mutliplexer 48 which receives bits AD24-27 (an output from register 35) at a second set of inputs. Multiplexer 48 is also controlled by signal S4. The outputs of multiplexer 48 are connected to the input of static RAM 38.

It is clear that in this case, the conversion of real addresses into physical addresses (memory 8B) and the generation of a module selection code, based on a physical address, are performed in time sequence or in cascade. If no time constraints preclude such arrangement, it could result in an advantage because it simplifies the process of generating physical addresses to be loaded in memory 8B and renders it independent of the local memory configuration and of the module selection process.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A multiprocessor system including a plurality of processing units, (CPUs) each having a processor, a local memory and an interface unit associated therewith which connects to a system bus, said each processor being connected to access the associated local memory through a local bus and each processor being connected to access a local memory of another CPU through the associated local bus, the associated interface unit, said system bus, said interface unit and said local bus of said another CPU and wherein data used by at least two of said CPUs constitutes global data which is stored with a copy thereof in each local memory of said at least two CPUs, said system further comprising:

a first address translation unit included in each of said plurality of CPUs for converting logical addresses of said global data, generated by the associated processor into real addresses, said real addresses each having a first field specifying referencing of a global memory space and a second field to be translated into a physical address, said first address translation unit further converting logical addresses of data which are not global into physical addresses; and, a second address translation unit included in each of said plurality of CPUs, said second address translation unit in each CPU being coupled to said first translation unit, to said local memory and to said interface unit through said local bus, said second translation unit in response to a real address received from either said first translation unit coupled thereto or from a first translation unit of another one of said CPUs coupled thereto through said system bus, said interface unit and said local bus, converting said second field of the received real address into a physical address for application as an address to said associated local memory.

2. The multiprocessor system of claim 1 wherein said system further comprises means for transferring a real address generated by said first translation unit in one of said CPUs for a write operation, to said second translation unit in each of said CPUs, said means for transferring sending said real address generated by said first translation unit associated with one CPU through said system bus to each of the other CPUs and said each second translation unit converting said second field of said real address into a physical address, said physical address being different in said CPUs for addressing a different location in each of said local memories of each of said CPUs.

3. The multiprocessor system of claim 1 wherein said second translation unit is a static read/write memory.

4. The multiprocessor system of claim 3 wherein said local memory in at least one of said CPUs comprises a plurality of modules individually selectable for a read/write operation by a selection code obtained from a field of a physical address and said second translation unit associated with said local memory translating the received real address into said physical address and said module selection code.

* * * * *